United States Patent [19]
Roth

[11] 3,940,208
[45] Feb. 24, 1976

[54] CONTROL FREQUENCY GENERATOR FOR A MOVIE CAMERA

[75] Inventor: Johann Roth, Schwabhausen, Germany

[73] Assignee: Braun Aktiengesellschaft, Frankfurt am Main, Germany

[22] Filed: Jan. 21, 1974

[21] Appl. No.: 434,850

[30] Foreign Application Priority Data
Jan. 26, 1973   Germany............................ 2303932

[52] U.S. Cl. ...................... 352/12; 352/23; 352/177
[51] Int. Cl.² .......................................... G03B 31/00
[58] Field of Search ............ 352/12, 19, 21, 22, 23, 352/25, 177; 354/133

[56] References Cited
UNITED STATES PATENTS

| | | | |
|---|---|---|---|
| 1,969,465 | 8/1934 | Jones ................................ | 352/12 X |
| 2,730,937 | 1/1956 | Martin et al. ....................... | 354/133 |
| 3,492,068 | 1/1970 | Baron ................................ | 352/12 |
| 3,502,397 | 3/1970 | Buhler ............................... | 352/12 X |

FOREIGN PATENTS OR APPLICATIONS 715,595   9/1954   United Kingdom................... 352/23

*Primary Examiner*—Fred L. Braun
*Attorney, Agent, or Firm*—Ernest F. Marmorek

[57] ABSTRACT

In a movie camera a control frequency generator for producing a picture and sound synchronizing sinusoidal control frequency using a rotating member of the camera such as a running gear made from a soft magnetic material and having a magnetically discontinuous region formed therein, a permanent magnet having one pole thereof placed in the vicinity of the discontinuous region, and a magnetic flux sensing device placed between the region and the pole of the permanent magnet for sensing the flux changes within the magnetic circuit during rotation of the camera gear and thereby producing the synchronizing control frequency.

11 Claims, 5 Drawing Figures

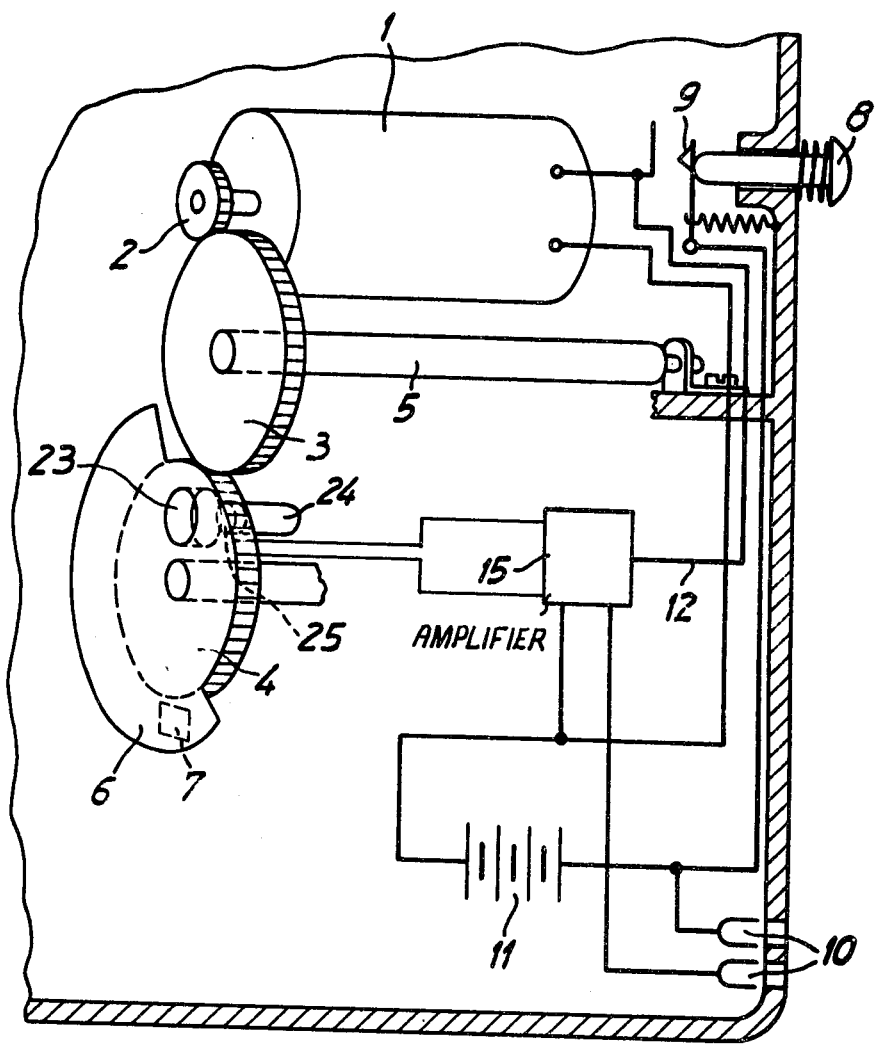

3,940,208

CONTROL FREQUENCY GENERATOR FOR A MOVIE CAMERA

FIELD OF THE INVENTION

The present invention relates to a control frequency generator for a movie camera for producing a picture synchron signal of the sinusoid type which is especially used for synchronizing the running of the film during reproduction during which a tape recorder is also used for sound reproduction.

BACKGROUND OF THE INVENTION

In the area of producing a sinusoidal control frequency of the above type it has been known to employ a control frequency generator which in its structure resembles a dynamo which is driven synchronously with respect to the running of the movie camera.

The last mentioned type control frequency generator requires a very high driving energy and also requires substantial space, thus consequently it will contribute to the cost of the apparatus. Such control frequency generators are, therefore, not practical for amateur movie cameras.

SUMMARY OF THE INVENTION

It is, therefore, an object of the present invention to provide an improved control frequency generator for a movie camera which is simple in its structure and can be ecomonically manufactured and, at the same time, requires a small space and energy for its operation.

According to the present invention on a rotating member of the running gear of the movie camera which is made from a soft magnetic material there is provided a magnetic discontinuity in the circumferential direction and a permanent magnet is arranged with one of its poles in the vicinity of such region and a sensing means for sensing the magnetic flux is placed between such region and the adjacently lying pole, and which sensing means produces the electrical control frequency pulses.

According to one aspect of the present invention the sensing means comprises a field plate, therefore, the magnitude of the control frequency is defined by the electrical resistance of the field plate which resistance changes along with the pulsating magnetic flux.

According to another aspect of the present invention, the sensing means comprises an induction coil. The electrical control frequency magnitude is, therefore, a voltage.

Furthermore, a hall generator can also be used as the sensing means.

A relatively pure sinusoidal frequency can be obtained when the sensing means feeds into a filter network. Such network according to the present invention is constructed in such a manner that the fundamental frequency is attenuated weakly, whereas the harmonics are attenuated strongly.

According to a preferred embodiment of the present invention the permanent magnet with its other pole is arranged at the location further away from the magnetically discontinuous region but in the vicinity of the rotating member of the gear. As a result, there will be a much larger magnetic flux produced and, accordingly, the flux change becomes relatively large.

According to a preferred aspect of the present invention a simple structure will result when the magnetically discontinuous region is a non-circular region on the shaft of the driving gear of the moving camera. With such construction there will be no need for additional elements. It will require only an appropriate shaping of a portion of the shaft.

Alternatively, according to the present invention the magnetically discontinuous region can be in the form of a disc. Such latter embodiment has the advantage that it will permit a relatively large change of the magnetic flux without adversely affecting the stiffness of the shaft of the driving gear. The disc according to the present invention can be provided with apertures.

BRIEF DESCRIPTION OF THE DRAWINGS

The present invention will become more readily apprent from the following description of preferred embodiments thereof shown in the accompanying drawings, in which:

FIG. 1A is similar to FIG. 1 but shows another embodiment.

DESCRIPTION OF THE PREFERRED EMBODIMENTS

Figure 1:
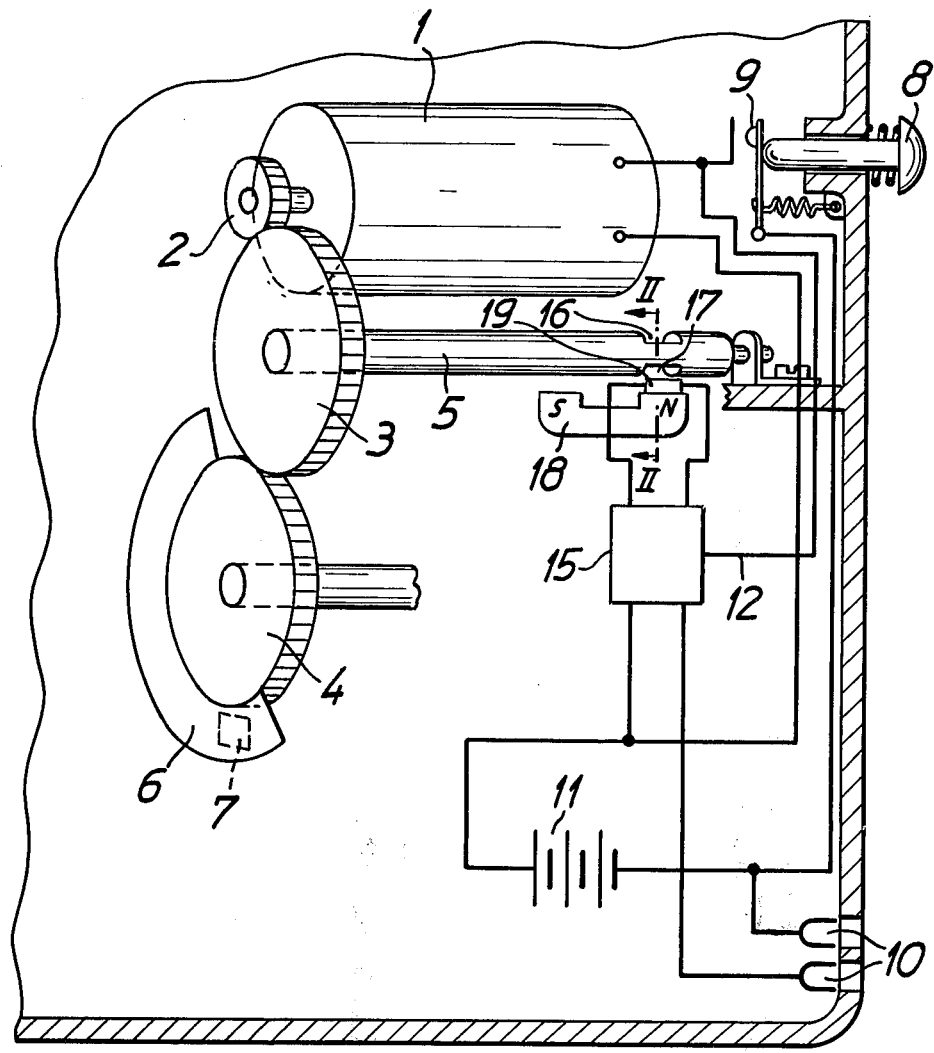
FIG. 1 illustrates schematically the essential elements of the driving gear of a movie camera including the control frequency generator according to the present invention.

With reference to FIG. 1 it is seen that the driving gear arrangement of a movie camera includes a motor 1 which by means of a pinion gear 2 drives a toothed wheel 3 which is secured onto a long shaft 5.

The toothed wheel 3 is in operational engagement with a toothed wheel 4 having a similar number of teeth thereon and which carries secured thereto a shutter device 6 which rotates in front of a picture window 7. The motor 1 becomes energized over a switch means 9 from a battery 11 when a hand operable starting button 8 is depressed.

Figure 2:
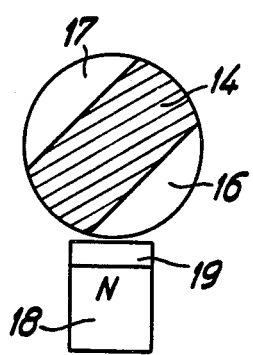
FIG. 2 is a sectional view along the line II—II in FIG. 1.
Figure 3:
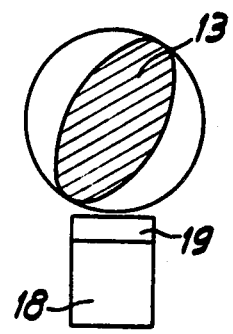
FIG. 3 is a sectional view along the line II—II of FIG. 1, however, illustrating a different embodiment.

The shaft 5 is provided with a pair of recessed regions 16 and 17 which have a dimension reduced, by milling, such as can be seen more closely in the illustration of FIG. 2 or alternatively in FIG. 3. In the vicinity of such regions 16 and 17 the north pole of a permanent magnet 18 is placed, the south pole of which extends to a location remote from the aforementioned regions 16, 17 and near the shaft 5 so that a magnetic circuit is formed as hereinafter described. In front of the north pole of the permanent magnet 18 lies a field plate 19 the output connections of which are fed into a sinewave shaping amplifier 15. The output voltage of the amplifier 15 is taken off at the output terminals 10.

The supply conductor 12 for the amplifier 15 is connected to one of the terminals of the motor 1 and when the switch 9 is actuated it becomes energized simultaneously with the motor 1.

During operation of the running or driving gear of the movie camera, the shaft 5 is rotating so that alternatively either one of the recessed regions 16 or 17 is followed by a non-recessed region 14 of the shaft 5 as it passes in front of the field plate 19. As a result, the air gap of the magnetic circuit swept by the field lines of the permanent magnet 18 will continuously change, so that the induction process undergoing within the magnetic circuit will also consequently change. The resulting changes of the ohmic resistance of the field plate 19 will result in an output which is then amplified within the sine-wave amplifier 15 and will produce a sinusoidal output voltage.

It can be seen that due to the fixed coupling of the shaft 5 with the shutter arrangement 6, an alternating voltage is produced the frequency of which is in exact synchronism with the turning frequency of the shutter arrangement 6.

The control frequency which can be taken off at the terminals 10 can be, for example, recorded on the second track of a magnetic tape and used as a pilot or clock sound, on the first track of such tape on the other hand the regular sound can be recorded. A filter network can be included to filter out harmonics.

FIG. 1A shows an alternative embodiment in which the disc 4 is provided with an aperture 23 and which passes in front of a rod magnet 24 and on the end of which lying adjacent the aperture a Hall generator 25 is provided, as a sensing means, which then feeds its control frequency to an amplifier similar to amplifier 15.

With reference to FIG. 3, it is noted that it illustrates a different embodiment of the recessed regions of the shaft 5, which are similar to the embodiment illustrated in FIG. 2, however, are differently shaped. From FIG. 3 it is seen that the shaft 5 has a recessed region of an oval cross-section and, as a result, the flux change of the magnetic flux circuit, above described, will undergo a change which approximates a sinusoidal shape so that the sine-wave shaping amplifier can be omitted. Of course, it can be replaced by a straight-forward amplifier.

Figure 4:
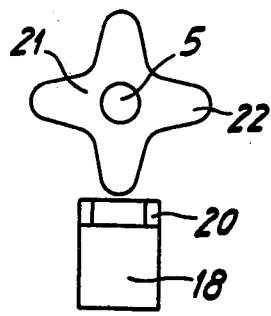
FIG. 4 is a sectional view along the line II—II of FIG. 1, however, illustrating still a further embodiment at that section.

FIG. 4 illustrates still a further embodiment of a control frequency generator according to the present invention in which instead of a field plate 19 as illustrated in FIG. 1, an induction coil 20 can be provided instead of the recessed regions 16 and 17 or 13 of FIGS. 1–3 the shaft 5 is provided with a disc 21 which has 4 cam-like wings or lobes formed thereon. During the rotation of the shaft 5 the lobes 22 will pass in front of the induction coil 20 and the resulting change in the magnetic resistance or the reluctance of the magnetic circuit of the permanent magnet 18 will cause a flux change in the vicinity of the induction coil 20 which will induce a voltage in the coil and fed to an amplifier and used for the purposes as described in connection with the first embodiment of FIG. 1.

The non-circular regions whether they are the regions 16, 17 or the oval region 13 or the lobes 22, serve as the means for changing the flux relationship within the magnetic circuit. They can be placed also in other locations within the camera. For example, for similar purposes, one may use the teeth of the toothed wheels 3 or 4 made from a soft iron material. It is also noted that instead of providing the recessed regions 16, 17 or the oval region 13, or the lobes 22, one may similarly provide also protruding portions on the shaft 5, such as iron protrusions which are glued to the shaft 5.

Within the scope of the present invention under the term "a magnetically discontinuous region" one should understand regions which due to their shaping and/or to their magnetic flux-shaping properties, will cause a magnetic flux change during movement of the active parts within the running gear of a movie camera.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a movie camera, a control frequency signal generator for producing a picture and sound synchronizing sinusoidal control frequency signal including a magnetically discontinued region in a rotating member of said camera, a permanent magnet having one pole thereof disposed in the vicinity of said region to define therewith a magnetic circuit, and a magnetic flux sensing means disposed between said region and said pole of said permanent magnet and operable for producing said control frequency signal from the flux changes within the magnetic circuit during rotation of said member.

2. The combination as claimed in claim 1, wherein said sensing means is a field plate means.

3. The combination as claimed in claim 1, wherein said sensing means is an induction coil.

4. The combination as claimed in claim 1, wherein said sensing means is a Hall generator.

5. The combination as claimed in claim 1, wherein said permanent magnet has its other pole extending further away from said magnetically discontinuous region in the vicinity of said rotating member.

6. The combination as claimed in claim 1, wherein said magnetically discontinuous region comprises a non-circular shape of a shaft.

7. The combination as claimed in claim 1, wherein said magnetically discontinuous region comprises a disc means.

8. The combination as claimed in claim 7, wherein said disc means comprises recessed and protruding regions for producing said flux changes in the magnetic circuit when rotated.

9. The combination as claimed in claim 1, wherein said camera includes a shutter device, said discontinuous region is an aperture in said shutter device and said sensing means comprises a Hall generator disposed on said permanent magnet.

10. The combination as claimed in claim 1, wherein said magnetically discontinuous region comprises an ovally shaped region on said rotating member which when said rotating member rotates produces a sinusoidal change in the magnetic flux produced by said permanent magnet.

11. The combination as claimed in claim 1, wherein said magnetically discontinued region comprises a pair of recessed regions defined in said rotating member and therebetween non-recessed regions, whereby when said recessed regions alternatively with said non-recessed regions of said rotating member pass in the vicinity of said permanent magnet, said discontinued region will produce changes in the flux of said magnetic circuit, said sensing means being operable for producing a voltage in accordance with said flux changes, and an amplifier means coupled to said voltage and operable for producing a sinusoidal control frequency.

* * * * *